Sept. 15, 1964 O. F. LARSEN 3,148,758
APPARATUS FOR POSITIONING AND RETAINING RECORD MATERIAL
Filed Oct. 11, 1962 3 Sheets-Sheet 1

INVENTOR
OSCAR F. LARSEN
BY Louis A. Kline
Wilbert Hawke, Jr.
HIS ATTORNEYS

Sept. 15, 1964                 O. F. LARSEN                 3,148,758
APPARATUS FOR POSITIONING AND RETAINING RECORD MATERIAL
Filed Oct. 11, 1962                                3 Sheets-Sheet 2
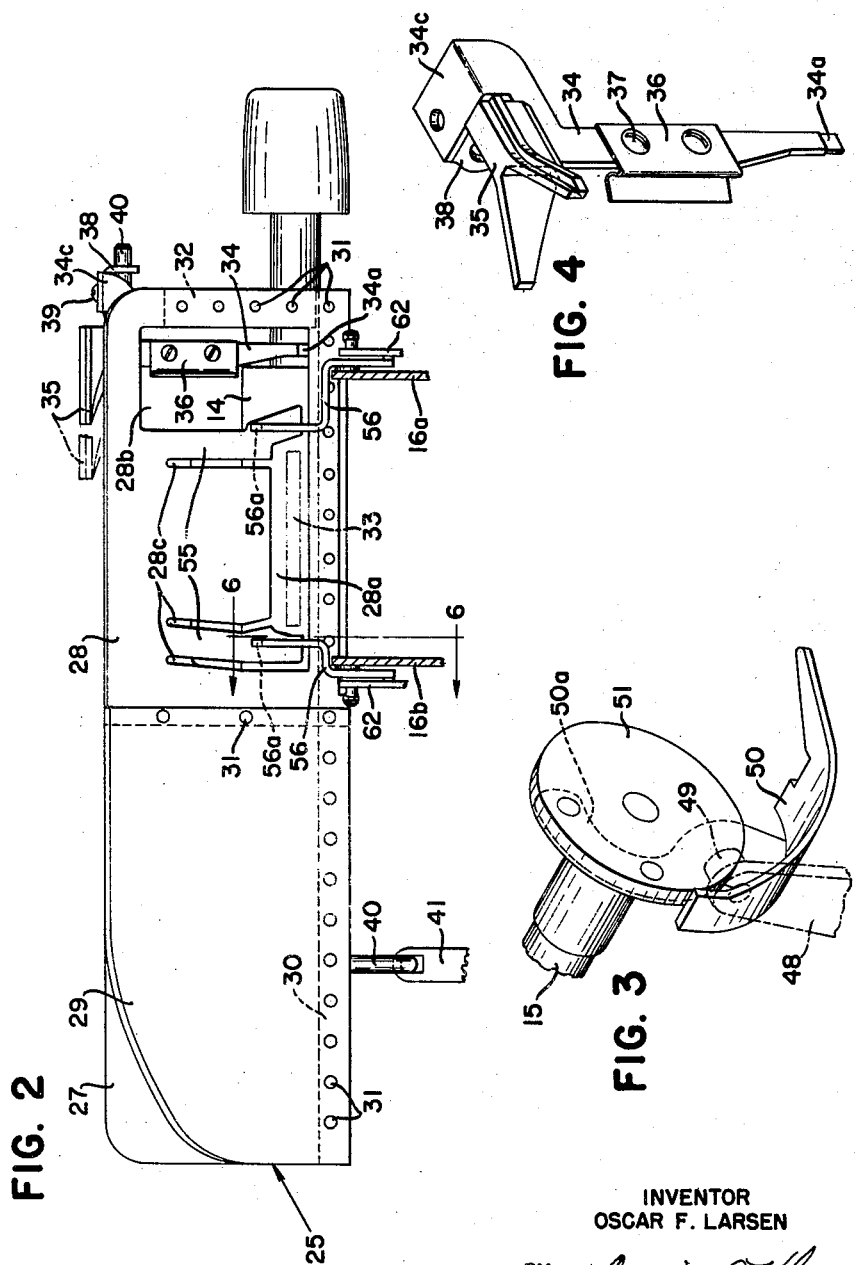
INVENTOR
OSCAR F. LARSEN
HIS ATTORNEYS Sept. 15, 1964          O. F. LARSEN          3,148,758

APPARATUS FOR POSITIONING AND RETAINING RECORD MATERIAL

Filed Oct. 11, 1962          3 Sheets-Sheet 3

INVENTOR
OSCAR F. LARSEN

BY

HIS ATTORNEYS

3,148,758
APPARATUS FOR POSITIONING AND RETAINING RECORD MATERIAL

Oscar F. Larsen, Ithaca, N.Y., assignor to The National Cash Register Company, Dayton, Ohio, a corporation of Maryland
Filed Oct. 11, 1962, Ser. No. 229,884
9 Claims. (Cl. 197—127)

This invention relates generally to record handling means for business and like machines, and, more particularly, relates to improved apparatus for such machines to both transfer a record material grossly positioned within a machine carried fixed card chute to a fine position therewithin and to retain such record material at the fine position throughout a printing operation performed thereon, all taking place during a single machine cycle of operation.

As is usual in machine recording of selective indicia on such record material as checks and the like, the machine operator inserts each check into a precisely formed receiving chute and manipulates same until abutted against a print position defining stop included in the chute construction. While such manual positioning of a check is many times adequate in that the printed record to be applied thereto has only to be presented at an approximately defined print field therealong—that is, may be considered acceptable even though same varies within permissible bounds one way or the other from the end of the check, certain media processing procedures presently used in modern business (such as automatic reading of all machine recorded indicia presented on checks and the like) require the printed record so presented on the check to be held to a precisely defined print field therealong—that is, not varying any appreciable extent one way or the other from the check end. To perform this latter, exact positioning of record material requirement, it is herein taught to cause the business machine being employed to itself finalize at the very beginning of each cycle of operation thereof the record material (check and the like) which has been grossly positioned by the machine operator within the receiving chute prior to machine cycle initiation. This operation is simply performed by the replacing of the usual print field defining fixed stop means of the card chute with a uniquely designed and operated print field defining movable stop means, hereinafter referred to as a combined check stop and urging mechanism in that same both demarks an approximate position for each check when manually inserted into the card chute prior to machine operation and then actually nudges or shifts the check a precise distance along such chute during machine operation. Of course, the extent of shifting of each check by the instant invention is determined by the gross positioning thereof within the card chute (sometimes abutted against the movable stop means and sometimes falling short thereof), the end result being that a fine positioning of each check is always had before the printing operation takes place.

After the fine positioning of each check and the like has been so completed, it is then desirable to effectively maintain same thereat throughout the period of time that the printed record is being presented thereon. Even though the presently devised check stop and urging mechanism performs its task in precisely positioning each check prior to the performance of the printing operation, it is apparent that the results obtained thereby must be maintained until the overall printing operation has been completed. Otherwise, further "unintentional" shifting of the check from its fine position may be had immediately before or even during the performance of the printing operation, either of which would cause the printed record, and thus the check, to be unacceptable for later automatic processing. To overcome this possibility of unwanted check shifting, which may result from slight vibration being set up during machine operation or even by the actual impact of print hammers being driven thereagainst during printer operation, the instant invention includes further means for actually holding each check in its fine position prior to and throughout the printing operation performed thereon, all being done through regular operation of uniquely designed check clamping mechanism described in detail hereinafter.

From an understanding of the above description, it is seen that the primary object of the instant invention is to provide improved fixed card chute type apparatus for automatically positioning checks and the like from a gross position to a fine position with respect to a machine printer mechanism and for retaining such checks and the like at the fine position until such printer mechanism has completed its recording operation thereon.

A further object of the invention resides in the extreme simplicity and low cost factor of such an apparatus as adapted to any of the usual line of business and like machines.

With these and incidental objects in view, the invention includes certain novel features of construction and combinations of parts, a preferred form or embodiment of which is hereinafter described with reference to the drawings which accompany and form a part of this specification.

Of the drawings:

FIG. 2 is a front view of a fixed card chute and portions of associated mechanism making up the instant invention;

FIG. 3 is a perspective detail, on an enlarged scale, of a precisely developed operating cam member of the instant invention as attached to the machine rear drive shaft;

FIG. 4 is a perspective detail, on an enlarged scale, showing a shiftable check stop and urger member of the instant invention;

Figure 5:
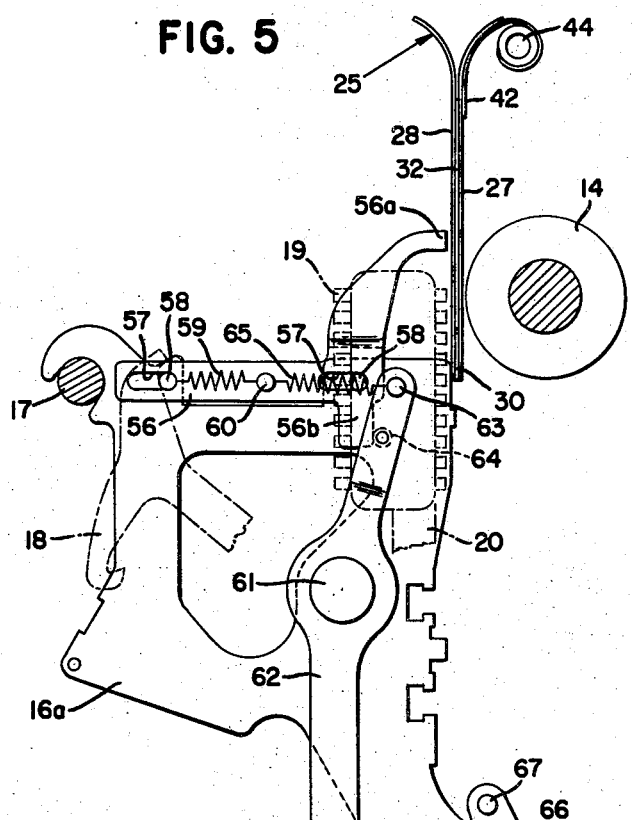
Figure 6:
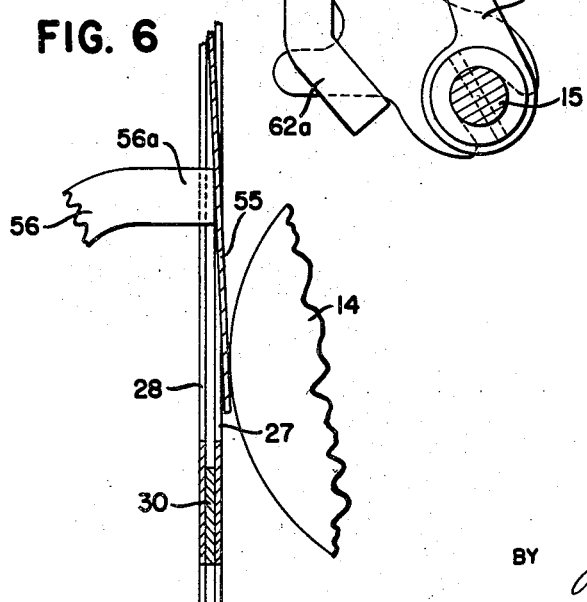

FIG. 5 is a view in side elevation of the check clamping mechanism portion of the instant invention, defining the mounting thereof with respect to the machine carried printer unit, and being illustrated in an unoperated position with respect to the associated card chute; and FIG. 6 is a greatly enlarged detail view of a portion of the mechanism of FIG. 2, being taken on line 6—6 thereof, and being shown when in an effective position with respect to the associated card chute.

Machine Mechanism

Figure 1:
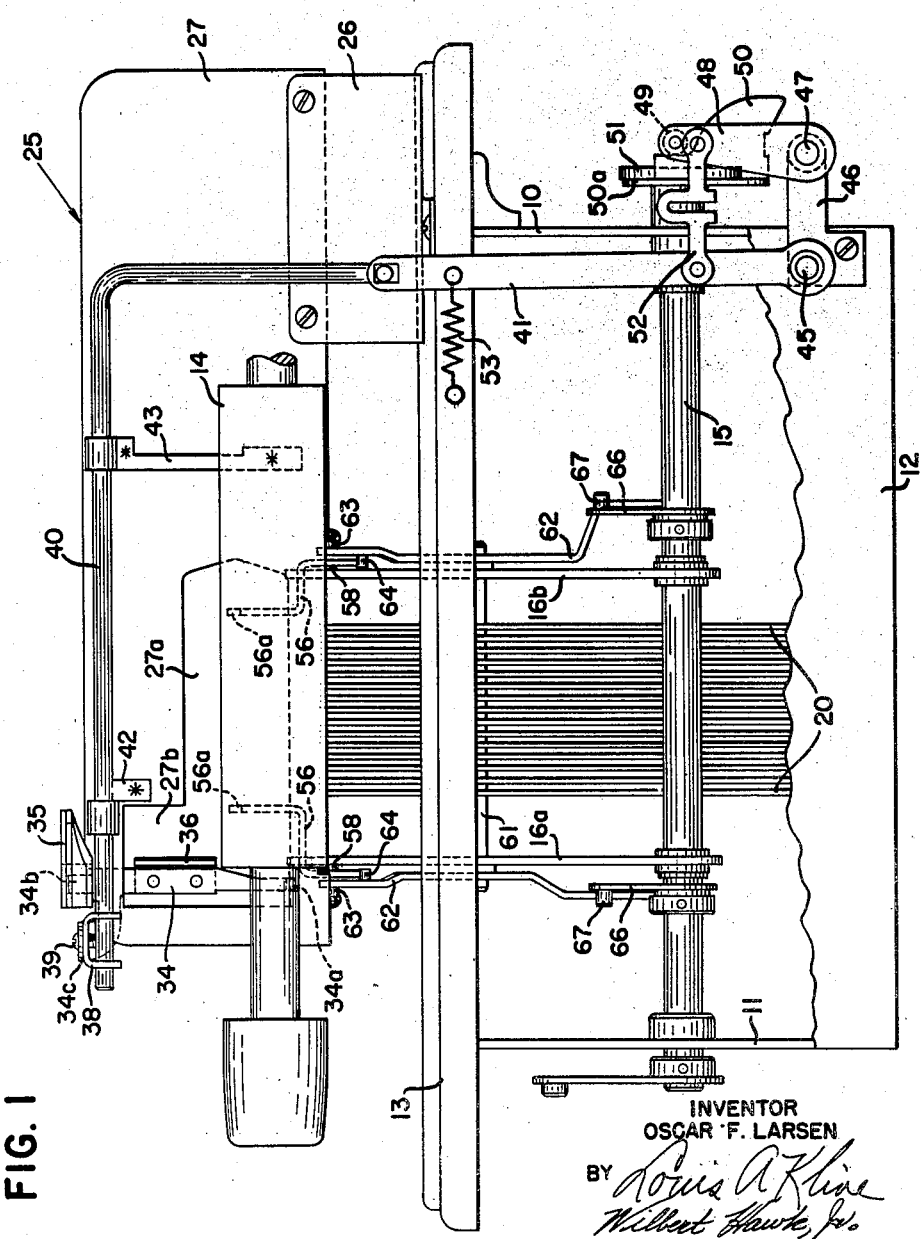
FIG. 1 is a rear view of a business and like machine embodying the instant invention, with the machine case removed and with particular emphasis being directed to those machine elements essential to a complete understanding of the now presented application.

While the present invention, for the sake of convenience, is herein shown and described as being incorporated in a calculating machine, it will become evident from a study of the present disclosure that such invention is not limited to use with machines of this specific type, but may also be applied to other types of business machines, such, for example, as to adding and accounting machines, with equally desirable results. The selected calculating machine herein disclosed, insofar as it relates to the instant invention, is supported by a framework including a left vertical side plate 10, a right vertical side plate 11, and a back frame plate 12 (FIG. 1). Extending across the upper rear surfaces of such side plates 10 and 11 is a horizontal bar member 13, which, although not precisely illustrated herein (FIG. 1), supports the usual paper platen 14 included in the machine construction (see also FIGS. 2 and 5). Such machine framework is standard construction, as can be understood from the early patent to H. C. Peters, No. 1,386,021, as one example.

Since the complete mechanism for giving the calculating machine cycles of operation is well known to the art, being shown and described in numerous patents, such as No. 2,760,722, which issued to Nelson Frieberg et al., only that portion of the overall mechanism necessary to give an understanding of the instant invention is included herein. Through operation of either an electric motor or operating handle (not shown), a machine rear drive shaft 15 is caused to oscillate first counter-clockwise and then clockwise back to its home position (FIG. 5). As illustrated in FIG. 1, such drive shaft 15 is journaled between the machine left and right vertical side plates 10 and 11 and provides a lower supporting means for a pair of spaced-apart printer side frames 16a and 16b, which printer side frames 16a and 16b, are further supported at their upper ends by a fixed shaft 17 extending between the framework right and left side plates 10 and 11 (again see FIG. 5). Oscillation of the rear drive shaft 15 during each machine operation sets in motion numerous machine operational functions, one of which is the actuation of a plurality of latch members for releasing associated print hammers 18 for a printing stroke. This permits such print hammers to be impelled against selected type members 19 carried by the upper end portions of associated type bars 20, which type bars 20 are differentially adjusted near the beginning of each machine cycle of operation in accordance with the digit amount being selectively entered into the machine. Of course, the striking of each type member 19 by its associated hammer 18, which takes place near mid-cycle of a machine operation, drives such type member 19 toward engagement with the paper platen 14 therebehind. By means of the usual ink ribbon (not shown herein), the type member carried indicia is caused to be imprinted on the record material then engaging the platen 14. Further reference may be had to United States Letters Patent No. 2,666,574, issued to Carl H. Carlson et al., for a detailed understanding (both structure and operation) of the various printer carried elements herein only generally referred to.

Card Chute

Extending along the front side of the paper platen 14—that is, arranged so as to be disposed between such platen 14 and the associated type bars 20 (FIGS. 1 and 5), is a card receiving chute designated generally by the numeral 25. The mounting of such chute 25 is by means of a pair of bracket members 26 (one only shown, FIG. 1) fixing same to the upper surface of the machine framework horizontal bar member 13. This, as can be understood from both FIGS. 1 and 2, presents the card chute 25 at that precise position where the paper platen 14 is immediately therebehind and the differentially adjustable type bars 20 are immediately therebefore. The overall construction of such card chute 25, as best understood from FIGS. 2 and 5, comprises a back wall 27 and a pair of interconnected front wall portions 28 and 29 spaced therefrom in a fixed relationship by means of rivets 31 and the like extending therethrough and through an intervening spacer strip 30 directed along the lower end portions thereof. The right-hand end portions of such back wall 27 and front wall portion 28 are likewise so spaced and fixed by means of additional rivets 31 engaging a further spacer strip 32 provided therebetween. This, as best understood from FIG. 2, leaves both the left-hand end portion and the top portion of such card chute 25 free and clear for receiving checks and like record materials caused to be manually inserted between the back wall 27 and the interconnected front wall portions 28 and 29. The vertical positioning of any record material, such as a check, within such card chute 25 is automatically had as the lower edge thereof comes to rest against the upper surface of the spacer strip 30, with the horizontal positioning thereof being determined by how far rightwardly along the chute the machine operator manually carries same.

Returning again to FIG. 1, it is seen that the card chute back wall 27 is provided with a cut-out zone 27a immediately behind the group of type bars 20. Such zone 27a, as best understood from FIG. 5, permits the selected type members 19, when struck by the associated print hammers 18, to contact, after engaging the usual ink ribbon, any record material (check) positioned within the card chute 25, and force that area thereof positioned immediately behind the selected type members 19 (such as the phantom line zone 33 designated in FIG. 2) into printing engagement with the paper platen 14 therebehind. A further cut-out zone 28a of the card chute front wall portion 28 (FIG. 2) enables the selected type members 19 to freely contact the chute entered check at its print receiving area, which area may likewise be considered the actual printing line of the herein-employed machine. Thus, the phantom line zone 33 illustration of FIG. 2 may be considered to represent either the defining of a print receiving field of a check inserted into the card chute 25, or the usual printing line of the calculating machine hereof. In either instance, such zone is where the selected type members 19 will be driven toward the paper platen 14 therebehind. Thus, release of the print hammers 18 near mid-cycle of a machine operation will cause a printed impression to be made either on a check contained in the card chute 25 or on the paper platen 14 itself in the absence of a check within such chute 25, both being at zone 33 of FIG. 2.

For the sake of ease both in the insertion and removal of a check within and from the card chute 25, the upper left-hand corner of the chute front wall portion 29 is curled forwardly (FIG. 2), as are the upper edge portions of both the remaining length of such wall portion 29 and the overall length of the companion wall portion 28 (FIG. 5). To permit still further freedom of check entrance and removal with respect to such card chute 25, the back wall 27 thereof has its upper edge portion curled rearwardly (FIG. 5). The interconnection of the chute front wall portions 28 and 29 may be made by any suitable means, such as through additional rivets 31 securing the wall portion 29 right-hand edge to the face of the wall portion 28 left-hand edge (FIG. 2). For the sake of immediate visual cognizance of a check within the card chute 25, the chute front wall portion 29 may conveniently be formed from any suitable transparent material.

Check Stop and Urging Mechanism

All other things being not considered, it is apparent that each check inserted into the card chute 25 may be moved rightwardly therealong until coming into contact with the above-described spacer strip 32. This type positioning of a check would be the normal practice followed whenever the longitudinal positioning of a machine prepared printed record thereon does not have to be extremely precise—that is, fall within definite and closely held bounds. On the other hand, when the record receiving zone of a chute entered check is extremely important, such as for the reasons above stated, the manual positioning thereof initially within the receiving chute 25 is deemed not sufficient since there is no assurance that the machine operator will always be successful in abutting same against the strip 32 or any other fixed stop provided. To insure a fine positioning of each check inserted into the card chute 25—that is, so that any printing thereon will always be positioned at an exact and non-varying zone therealong, the following described mechanism is caused to be operated during machine cycling for actually shifting the check from its initial (gross) positioning within the card chute that amount which presents the record receiving zone thereof at the required printing position with respect to the machine carried type bars 20.

Further cut-out zones 27b and 28b are provided in the card chute back wall 27 and front wall portion 28, respectively (FIGS. 1 and 2), each aligned with the other, and both being disposed so as to extend along the right-hand end portion of the overall card chute construction. Although not necessarily required to be such, these additional cut-out zones are herein illustrated as being upstanding leg portions of those cut-out zones 27a and 28a described previously. Extending downwardly within the card chute 25, at such cut-out zones 27b and 28b thereof (FIGS. 1 and 2), is a check stop and urging arm 34, being of that construction (FIG. 4) which permits same to slide freely along the overall width of the zones 27b and 28b. Although not illustrated herein in any amount of detail, the upper end portion of such arm 34 lies freely within the card chute 25—that is, is free and clear of any engagement with either the back wall 27 or the front wall portion 28 thereof, while the lower end of such arm 34, at tail portion 34a, slidingly engages such card chute 25—that is, extends slidingly between the respective back wall and front wall portions thereof. In effect, tail portion 34a of the check stop and urging arm 34 provides a lower guide for maintaining smooth operation of such arm within the chute 25. Secured to the uppermost end of such arm 34, so as to extend above the card chute 25, is a check engaging member 35, which member 35 is hereinafter referred to as a check first urger 35. As illustrated in FIG. 1, the mounting of such urger 35 is simply the pressing thereof onto an upper tab portion 34b of the arm 34. Secured to a center portion of such arm 34, so as to be disposed within the chute cut-out zones 27b and 28b, is a further check engaging member 36, hereinafter referred to as a check second urger 36. As best understood from FIG. 4, both of such check first and second urgers 35 and 36 are of that configuration which presents a pair of horizontally spaced apart and vertically aligned V-shaped grooves in position to engage the rightmost edge of each check inserted into the card chute 25. As best understood from the illustration of FIG. 2, the provision of such urgers 35 and 36 on the arm 34 provide a positive longitudinal stop for each check when manually inserted into the card chute 25. While any suitable mounting means may be employed for securing the check second urger 36 to the arm 34, same is herein illustrated as being so done through the use of screws 37 (FIG. 4).

A further upper portion 34c of the check stop and urging arm 34, which likewise extends above the card chute 25, is formed rearwardly to extend a distance therebehind. Secured to the under surface of such arm portion 34c is a stirrup clamp 38, which clamp 38, by means of a locking screw 39, is secured to the right end portion of an actuating rod 40. As illustrated in FIG. 1, the actuating rod 40 extends from such stirrup clamp 38 a precise distance leftwardly along the upper end portion of the card chute back wall 27, and thence is formed downwardly to pivotally interconnect the upper end portion of an associated operating arm 41. Appropriate mounting brackets 42 and 43, each secured to the rear surface of the card chute back wall 27, slidingly support that portion of the actuating rod 40 extending therealong (FIG. 1). The precise construction of each of such mounting brackets 42 and 43 is best understood from FIG. 5, where there is illustrated (for the bracket 42) a rod engaging bearing member 44 supported by an upper curled end portion thereof.

As illustrated in FIG. 1, the operating arm 41 has its lower end portion rotatably carried by a support stud 45, which stud 45 extends rearwardly from a mounting bracket 46 secured to the lower left-hand corner portion of the machine back frame plate 12. A further stud 47 extending rearwardly from such mounting bracket 46 rotatably supports a cam arm 48 having a roller member 49 aligned for engagement with a precisely developed camming surface provided on the outer side edge of an arcuate cam member 50 secured to the leftmost end of the machine rear drive shaft 15. As the details of FIG. 3 show, the precise mounting of such cam member 50 with respect to the machine rear drive shaft 15 is through an upper arm portion 50a thereof being secured to a driving disk 51 provided on such shaft. As is apparent when recalling previous description hereof, the usual oscillating movement imparted to the machine rear drive shaft 15, first counter-clockwise and then clockwise (FIG. 5), and reversely thereof (FIG. 3), will be likewise imparted to the interconnected cam member 50.

Further elements of the check stop and urging mechanism include a link 52 operably interconnecting the operating arm 41 with the cam arm 48 and a spring 53 yieldingly urging said operating arm 41 counter-clockwise about its support stud 45. With the provision of such link 52 and spring 53, it is seen (FIG. 1) that the roller member 49 is yieldingly maintained in engagement with the cam member 50 and that any movement imparted to the cam arm 48 thereby during oscillation of such cam member 50 will be transferred to the operating arm 41, in turn causing the interconnected actuating rod 40 to be shifted back and forth along the fixed card chute 25. As is well known in the art, the link 52 illustrated herein (FIG. 1) is of the adjustable type in order that a precise yet easily changed operating relationship may be had between the arms 41 and 48.

With the specific arrangement of the various check stop and urging mechanism elements just described, being like that best illustrated in FIG. 1, the first rocking movement imparted to the machine rear drive shaft 15 (counter-clockwise in FIG. 5 and clockwise in FIG. 3) is effective for shifting the actuating rod leftwardly (FIG. 2), and rightwardly (FIG. 1), and, in a like manner, the return rocking movement imparted thereto (clockwise in FIG. 5 and counter-clockwise in FIG. 3) is effective for returning such rod 40 to its starting position. Of course, such movement of the actuating rod 40 is transferred to the interconnected check stop and urging arm 34, whereby, as can best be understood from FIG. 2, the arm 34 is first moved a precise distance leftwardly along the card chute 25 and thereafter is returned rightwardly to its starting position—this happening during each machine cycle of operation caused to be initiated. As shown, this shifting from home position of the arm 34, which home position is determined by the zone of securement of such arm to the right end portion of the actuating rod 40, will take place prior to mid-cycle of each machine operation, whereas the return to home position of such arm 34 does not take place until near the end of each machine operation. While both the home positioning and the extent of movement of such check stop and urging arm 34 may conveniently be adjusted to fit the needs at hand, the important factors for consideration are that the arm carrying check second urger 36 may travel freely within the chute contained cut-out zones 27b and 28b provided therefor, and that the extent of movement thereof, along with the companion check first urger 35 carried by such arm 34, is sufficient to engage and shift leftwardly along the card chute 25 any check manually positioned anywhere close thereto. For the purposes hereof, it is felt that a check shifting movement in the neighborhood of five-eighths of an inch, such as from the solid line illustration of the check first urger 35 to the partial phantom line illustration thereof (FIG. 2), will always be effective for finalizing the positioning of each check grossly positioned by the machine operator when initially inserted into the card chute 25. This is to say that the machine operator has successfully performed the check inserting operation as long as the right-hand edge thereof comes within five-eighths of an inch of the vertically aligned V-shaped grooves of the check first and second urgers 35 and 36.

Of course, the specified travel of the check stop and urging arm 34 is such that each check engaged by the urgers 35 and 36 thereof is caused to present its record receiving field in precise alignment with the overall group of machine carried type bars 20. This, being designated by the numeral 33 in FIG. 2, is the zone where the printed record for such check will take place near mid-cycle of a machine operation, which is shortly after the check stop and urging arm 34 has completed its operation for shifting the check from the gross position to the fine position. As is apparent, the gross position of each check is determined by where the machine operator manually positions same, either in abutment with the check urgers 35 and 36 or spaced a distance therefrom. Although a single urger 35 or 36 would normally be effective for performing the desired check shifting task, the provision of both of same assures accurate positioning of each check even though a portion of its right-hand edge, or perhaps a corner zone thereof, is folded over or otherwise mutilated. A previous stapling or like attachment of the now-handled check to an invoice or bill many times destroys a corner portion thereof, while the actual removal of the check from a pad or book thereof many times presents same with an extremely uneven edge.

Check Clamping Mechanism

After a check, through regular operation of the just-described check stop and urging mechanism, has been shifted to a fine position with respect to the machine carried type bars 20, it is important that such check be maintained thereat throughout the printing operation next performed by the associated print hammers 18. To provide for this, the instant invention includes further mechanism regularly operated during a machine cycle of operation for engaging each check immediately after the fine positioning thereof has been completed and clamping same against the paper platen 14 until the overall printing operation has been completed thereon.

As illustrated in FIG. 2, further cut-out zones 28c of the card chute front wall portion 28 define a pair of downwardly extending fingers 55, one positioned adjacent each end of the printing line 33 and each having its free end portion terminating a slight distance therebelow. Such fingers 55, in view of the type of material used in the making of the card chute front wall portion 28, may be easily forced out of the plane of the chute portion 28 by any suitable means, after which same will automatically spring back to their normal planar alignment therewith.

One means for forcing each of such fingers 55 an extent rearwardly which causes same to actually clamp a chute contained check against the paper platen 14 is that as illustrated in FIG. 5. As shown, a clamp slide 56, by means of elongated slots 57 thereof engaging a pair of spaced-apart guide studs 58 extending outwardly from each printer side frame 16a and 16b (see also FIG. 1), is mounted for horizontal shifting movement along the upper end portion of each of the frames 16a and 16b. As best understood from FIGS. 1 and 2, each of such slides 56 is formed so as to present an upper nose portion 56a thereof in alignment with the front surface of a related one of the card chute fingers 55. In each instance, a spring 59, stretched between a slide carried stud 60 and the frontmost one of the guide studs 58, yieldingly urges the clamp slide 56 forwardly—that is, to a normal position where the upper nose portion 56a thereof is maintained free and clear of any engagement with the associated card chute finger 55. As illustrated in FIG. 5, such normal, spring-urged position of each slide 56 is defined by the rear wall portions of the elongated slots 57 thereof coming into engagement with the associated guide studs 58.

Rockably mounted on each end of a printer mechanism central shaft 61, so as to be disposed on the outer side of each printer side frame 16a and 16b, is a clamp slide actuating lever 62. Each of such levers 62, as best understood from FIG. 5, is yieldingly urged counter-clockwise under normal tension of an associated spring 65 stretched between an upper stud 63 thereof and the previously-described stud 60 carried by the associated slide 56; the extent of counter-clockwise rocking of such lever 62 being determined by a further stud 64 thereof coming into engagement with a lower tail portion 56b of the associated slide 56. As known, the spring 59 is of sufficient weight to normally maintain the clamp slide 56 in a finger non-engaging position, as illustrated in FIG. 5. The spring 65, in addition to being effective for normally maintaining the lever stud 64 against the slide lower tail portion 56b—that is, yieldingly urging the actuating lever 62 counter-clockwise, is also of that weight which is effective for overcoming the spring 59 for pulling the clamp slide 56 rearwardly along the guide studs 58 whenever a clockwise rocking movement is caused to be imparted to the actuating lever 62.

Also secured to the machine rear drive shaft 15 is a pair of cam arms 66 (FIG. 1), each having an operating stud 67 aligned with the lower end portion 62a (see also FIG. 5) of an associated one of the clamp slide actuating levers 62. Through regular oscillation of the cam arms 66 during each machine cycle of operation, first counter-clockwise and then clockwise (FIG. 5), each of the actuating levers 62 is caused to be rocked a precise distance clockwise as the lower end portion 62a thereof is engaged by the cam arm stud 67, and then is permitted to return counter-clockwise to home (as shown) as the cam arm stud 67 leaves engagement therewith. When so rocked clockwise, which will take place just prior to mid-cycle of a machine operation, each of the actuating levers 62, through its interconnected spring 65, causes the associated clamp slide 56 to be shifted rearwardly that extent which, as illustrated in detail in FIG. 6, deflects the aligned card chute finger 55 into engagement with the paper platen 14 therebehind. Of course, although not included in the illustrations hereof, that portion of the check then contained in the card chute 25 behind each finger 55 will be positively clamped thereby against the platen 14. As understood from FIG. 2, this effectively maintains the print receiving field of such check, which would be that zone thereof finely positioned at the printing line 33, firmly in contact with the paper platen 14. In view of the radial positioning of each cam arm 66 on the main drive shaft 15, the timing of clockwise rocking of each actuating lever 62—hence the rearward shifting of the clamp slides 56, takes place immediately after the above-set-out check stop and urging mechanism completes its fine positioning of a check initially positioned grossly within the card chute 25. This, of course, is just prior to the start of the printing operation performed by the machine. Counter-clockwise return to home of each actuating lever 62, under tension of the spring 59, is had immediately after the printing operation has been completed on the chute entered check, which is when the cam arms 66 are oscillated back to their starting positions. At this time the card chute fingers 55 spring back to their normal, planar positions, thus freeing the check and permitting the machine operator to remove same from the card chute 25.

Summary

While operation of the several mechanism included in the instant invention have been separately described hereinabove, it is clear that a combining thereof will present an overall apparatus operated during each machine cycle of operation for first shifting to a fine position a record material grossly positioned within a card chute, and thence retaining such record material at the fine position until a printing operation has been completed thereon. While there has been shown and described the fundamental novel features of the invention as applied to a preferred embodiment, it is to be understood that various omissions, substitutions, and changes in the form and operation thereof may be made by those skilled in the art without departing from the spirit of the invention. Therefore, it is my intention that the scope of the invention hereof be limited only by that which may be imposed by the following claims.

What is claimed is:

1. In combination with a business machine having a printer mechanism regularly actuated for recording selective indicia on a record material during each machine cycle of operation, an apparatus for positioning a record material to a precise position with respect to the printer mechanism and for retaining such record material at the precise position until indicia has been recorded thereon; said apparatus comprising a record material receiving chute mounted in fixed horizontal relation across said printer mechanism; guide means cooperating with said chute for slidingly supporting horizontally all record material received therewithin; a combined record material stop and urging mechanism associated with said chute; said stop and urging mechanism being normally positioned for locating all record material entered into the chute at a first position with respect to said printer mechanism; said stop and urging mechanism being operable from its normal position for shifting record material from said first position horizontally along said guide means; a record material clamping mechanism associated with said chute; said clamping mechanism being normally positioned for enabling all record material entered into the chute to move freely therewithin relative to said printer mechanism; said clamping mechanism being operable from its normal position for retaining record material in a fixed position within said chute; and drive means operated during each machine cycle of operation to first actuating said stop and urging mechanism from its normal position to a position where a record material located at the first position thereby is caused to be transferred horizontally within said chute to a second position with respect to the printer mechanism, and for then actuating said clamping mechanism from its normal position to a position where the transferred record material is caused to be maintained within the chute at said second position.

2. The apparatus of claim 1 in which said record material stop and urging mechanism comprises an arm member mounted for horizontal sliding movement along said chute; means normally maintaining said arm member in an unoperated position relative to said printer mechanism prior to machine operation; means for operating said maintaining means from normal and to a position where said arm member is shifted thereby from its unoperated position horizontally along the chute and to an operated position relative to said printer mechanism; said drive means actuating said operating means prior to actuation of said printer mechanism during each machine cycle of operation; and a record material engaging member on said arm member for, when said arm member is in its unoperated position, stopping at said first position a record material when entered into the chute, and for, when said arm member is shifted to its operated position, moving to said second position a record material then contained within the chute.

3. The apparatus of claim 2 in which said unoperated position maintaining means comprises an actuating rod interconnected to said arm member; said rod being mounted for horizontal shifting movement along said chute; means yieldingly urging said actuating rod to a normal position where said arm member is maintained thereby at its unoperated position; said operating means when actuated by said drive means overcoming said urging means and shifting said actuating rod from its normal, arm member unoperated position maintaining position to an arm member operated position presenting position horizontally along said chute; and said urging means returning said actuating rod to its normal position after completion of actuation of said operating means by said drive means.

4. The apparatus of claim 1 in which said record material clamping mechanism comprises a clamp finger carried by said record material receiving chute; said finger being normally biased to a non-engaging position with respect to a record material contained within said chute; said finger being deflectable from said normal position to an engagement-and-clamping position with respect to a record material contained within said chute; a clamp slide aligned with said finger and mounted for shifting movement to and from deflecting engagement therewith; yielding means normally maintaining said clamp slide in a finger non-engaging position; operating means for overcoming said yielding means and shifting said clamp slide into engagement with said finger for deflecting said finger from its normal position to its record material engagement-and-clamping position; and said drive means actuating said operating means prior to and throughout printer mechanism actuation during each machine cycle of operation.

5. The apparatus of claim 4 in which said record material receiving chute includes a back wall and a front wall portion spaced a distance therefrom, between which a record material may freely extend; said clamp finger normal positioning being defined by the plane of said chute front wall portion; and said clamp slide when shifted by said operating means deflecting said finger out of the plane of said chute front wall portion and into engagement with said chute back wall portion.

6. The apparatus of claim 5 in which said clamp finger is a precisely formed deflectable area of said receiving chute front wall portion.

7. In an apparatus for positioning a record material to a precise print receiving position with respect to a printer mechanism and for retaining the record material at such precise position until selected indicia has been recorded thereon; the combination of a record material receiving chute fixed horizontally across the printer mechanism; guide means slidingly supporting horizontally all record material received within said chute; a record material engaging member shiftable horizontally along said chute, said member being normally positioned for stopping all record material entered into the chute at a gross position with respect to the printer mechanism; a record material clamping member shiftable toward and away from said chute, said member being normally positioned for enabling all record material entered into the chute to move freely therewithin relative to the printer mechanism; means operated prior to printer mechanism operation for actuating said engaging member from its normal position a precise distance along said chute, whereby a record material grossly positioned thereby is caused to be shifted horizontally along said chute and to a fine position with respect to the printer mechanism; and means operated prior to printer mechanism operation for actuating said clamping member from its normal position a precise distance toward said chute, whereby a record material finely positioned by said engaging member is prevented from thereafter moving within said chute relative to the printer mechanism.

8. The apparatus of claim 7 in which said record material engaging member comprises a stop and urging arm mounted for horizontal sliding movement within said chute; and said engaging member actuating means comprises an actuating rod interconnected to said stop and urging arm; means normally positioning said actuating rod for maintaining said interconnected stop and urging arm at its normal, record material gross position stopping position; and a cam member adapted to overcome said actuating rod normal positioning means and operate said actuating rod to a position where said interconnected stop and urging arm is moved horizontally within said chute to its record material fine position shifting position.

9. The apparatus of claim 7 in which said record material receiving chute includes a finger portion deflectable therewithin from a normal, record material non-engaging position to a record material engaging position; said record material clamping member is aligned for deflecting engagement with said finger portion during actuation thereof toward said chute; and said clamping member actuating means comprises a cam member adapted to reciprocate said clamping member for deflecting said finger portion into record material engagement throughout printer mechanism operation and for permitting said finger portion to return to record material non-engagement thereafter.

References Cited in the file of this patent

UNITED STATES PATENTS

| | | |
|---|---|---|
| 968,087 | Shepard | Aug. 23, 1910 |
| 1,044,116 | Yaw | Nov. 12, 1912 |
| 1,047,476 | Wyckoff | Dec. 17, 1912 |
| 1,743,859 | Kupetz | Jan. 14, 1930 |
| 2,139,168 | Muller | Dec. 6, 1938 |
| 2,226,151 | Anderson | Dec. 24, 1940 |
| 2,307,122 | Fettig | Jan. 5, 1943 |
| 2,585,102 | Fettig | Feb. 12, 1952 |
| 2,827,145 | Anderson | Mar. 18, 1958 |